350-3.75 SR OR 3,610,722

United States Patent [11] 3,610,722

[72] Inventors Fritz Bestenreiner
Munchen;
Heinrich Nassenstein, Leverkusen; Gunther Langner, Leverkusen, all of Germany
[21] Appl. No. 669,235
[22] Filed Sept. 20, 1967
[45] Patented Oct. 5, 1971
[73] Assignee AGFA-Gevaert Aktiengesellschaft
Leverkusen, Germany
[32] Priority Sept. 21, 1966
[33] Germany
[31] A 53567 IXa/57a

[54] ARRANGEMENT FOR RECORDING AND REPRODUCING HOLOGRAMS OF MOVING SUBJECTS
5 Claims, 9 Drawing Figs.

[52] U.S. Cl. 350/3.5, 352/31, 355/2
[51] Int. Cl. G02b 27/22
[50] Field of Search 352/31, 131, 65–66; 350/3.5; 353/25, 26; 355/2

[56] References Cited
UNITED STATES PATENTS

| | | | |
|---|---|---|---|
| 2,982,176 | 5/1961 | Kay | 350/3.5 |
| 3,435,244 | 3/1969 | Burckhardt et al. | 350/3.5 |
| 3,442,566 | 5/1969 | Forward et al. | 350/3.5 |
| 3,511,553 | 5/1970 | Gerritsen et al. | 350/3.5 |

FOREIGN PATENTS

| | | | |
|---|---|---|---|
| 1,437,780 | 3/1966 | France | 350/3.5 |

OTHER REFERENCES
Gabor, Nature, " Character Recognition by Holography," October 30, 1965; No. 5009, Vol. 208; pages 422–423.
Paques et al., " Cineholography," C. R. Acad, Sc. Paris, 260:6562–6564 (6/1965).
Leith et al., Journal of the Smpte, Vol. 74 No. 10, pp. 893–896 (10/1965).
Vitols, IBM Technical Disclosure Bulletin, Vol. 8, No. 11 pp. 1581–1583 (4/1966).

*Primary Examiner*—David Schonberg
*Assistant Examiner*—Robert L. Sherman
*Attorney*—Michael S. Striker

ABSTRACT: Holograms of motion picture frames are recorded on a photosensitive carrier. When the carrier is moved with the holograms through coherent light, real images of the subject are formed which are reproduced for viewing.

INVENTORS:
Dr. FRITZ BESTENREINER
Dr. HEINRICH NASSENSTEIN
Dr. GÜNTHER LANGNER
BY
Michael S. Striker
Attorney INVENTORS:
BY Dr. FRITZ BESTENREINER
Dr. HEINRICH NASSENSTEIN
Dr. GÜNTHER LANGNER
Michael S. Striker,
Attorney

INVENTORS;

Dr. FRITZ BESTENREINER
BY Dr. HEINRICH NASSENSTEIN
Dr. GÜNTHER LANGNER

Michael S. Striker
Attorney

INVENTORS:

Dr. FRITZ BESTENREINER
BY Dr. HEINRICH NASSENSTEIN
Dr. GÜNTHER LANGNER
Michael S. Striker
Attorney

ARRANGEMENT FOR RECORDING AND REPRODUCING HOLOGRAMS OF MOVING SUBJECTS

BACKGROUND OF THE INVENTION

The present invention relates to a method, apparatus, and carrier for recording and reproducing moving subjects, such as the pictures on the frames of motion picture film.

In accordance with the prior art, moving subjects are photographically recorded on successive frames of a light-sensitive material, and reproduced by projection of the frames in rapid succession. In addition to this kinematographic recording, it is known to record the images of moving subjects by electromagnetically recording video signals on a magnetizable carrier, such as a magnetic tape.

The known systems for recording visual information have the disadvantage that the surface of the record carrier which is available for the storing of the information, is inefficiently utilized so that great amounts of the expensive carrier material, such as photographic film or magnetic tape, are required. Compared with the easily handled small phonographic record for acoustic information, the carriers of visual information according to the prior art are large, require expensive apparatus for recording, and use a great deal of expensive carrier material. It is evident that a motion picture film or a magnetic tape for recording visual information, requires far more material for recording and reproducing during the same time in which acoustic information is recorded and reproduced by a phonograph record.

SUMMARY OF THE INVENTION

It is one object of the invention to overcome this disadvantage of the prior art of recording visual information, and to provide a method and apparatus for recording visual information on a carrier of small size which is inexpensive and easily handled by persons without technical skills.

Another object of the invention is to record visual information in the form of holograms on a moving photosensitive record carrier, and to reproduce the real images formed by the holograms for viewing.

Another object of the invention is to record visual information in the form of holograms on a record carrier whose dimensions, material, and shape resemble a phonographic record.

In accordance with the invention, visual information is recorded in the form of holograms on a carrier which is continuously moved through reproducing apparatus when reproduction of the visual information is desired.

In order to produce a hologram on a photographic emulsion, the subject is placed in coherent light producing a reference wave so that the light reflected by the subject produces a subject wave which produces with the reference wave an interference image on the photographic emulsion. Where a wave peak reinforces other wave peaks, exposure results.

After development, the photographic emulsion shows a section of the wave field representing a pattern of more or less regularly arranged interference fringes. Generally, reference wave and subject wave are substantially coherent. It is known that a real and a virtual image of the subject can be produced by placing a hologram of the subject in coherent light of a suitable wave length. Under suitable exposure conditions, and using photographic emulsions of high resolution, holograms can also be made in less coherent light as is, for example, produced by a spectral lamp, or even by an incandescent lamp. However, in this event, the yield of utilizable light is much lower.

A particular advantage of holographic recording is that the holograms require substantially less space on the record carrier, so that recording of long scenes are possible on a comparatively small area.

Another property of holograms is that visual information is not represented by the hologram in the form of a picture area, but is distributed over the entire surface, so that each part of the hologram contains the entire visual information. A hologram can be cut into small portions, and each portion permits, within the limits of the tolerable quality, a reconstruction of the recorded subject. Consequently, it is possible to move the carrier of the hologram continuously past reproduction apparatus without producing a picture which is blurred due to the movement. The transition from one image in the form of a hologram to the next takes place without a noticeable interruption since the preceding picture fades while the intensity of the new superimposed picture increases. In this manner, a very good reproduction free of flicker is obtained while a small record carrier can be used for a long playing time due to the high storage capacity of the carrier.

A method according to the present invention comprises the steps of intermittently advancing a photosensitive carrier through at least substantially coherent light interfered by a reference beam and impinging motion picture frames showing a moving subject, recording on the carrier successive holograms of the subject continuously moving the carrier with the holograms through a readout beam of at least substantially coherent light to form real images of the subject, and reproducing the real images of the subject.

The record carrier is advantageously a circular plate having successive holograms of the subject disposed along a spiral track, and a tape having successive holograms of the subject along the length thereof may also be used.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
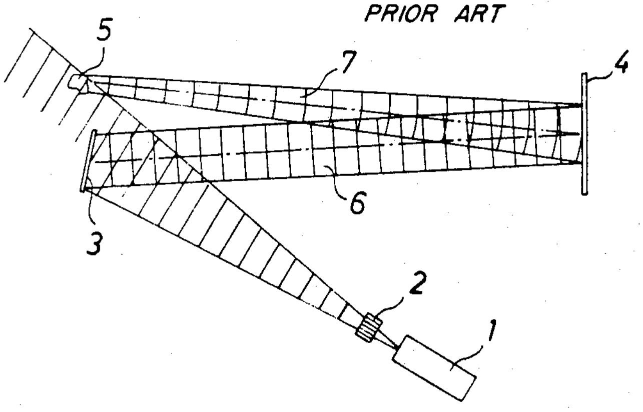
Fig.1 PRIOR ART
FIG. 1 is a schematic view illustrating a basic arrangement for producing the hologram of a subject.

Referring now to FIG. 1, which illustrates the principle of producing holograms by means of a laser, a laser 1 produces a beam of coherent light which is made divergent by a lens 2 and directed at a mirror 3 which reflects the beam of the coherent wave toward a carrier 4 whose surface is coated by a photosensitive emulsion. Another part of the beam of coherent light impinges a subject 5, which reflects a plurality of spherical waves in the form of a subject wave 7 which partly interferes with the reference beam 6 which has uniform spread wave fronts. Due to the interaction between the reference wave 6 and the subject wave 7, the exposed and developed photosensitive carrier has the hologram in the form of a pattern corresponding to a planar section through the spatial interferences of the reference and subject waves.

Figure 2:
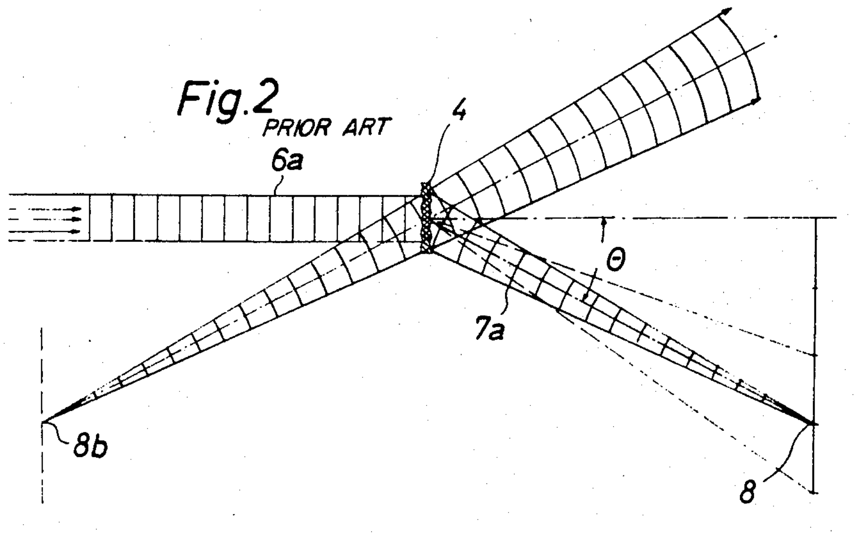
Fig.2 PRIOR ART
FIG. 2 is a schematic view illustrating the basic arrangement for reproducing a hologram.

When in accordance with FIG. 2, the hologram of the transparent record carrier 4 is penetrated by a beam of coherent light 6a at the same angle at which the record carrier was impinged by the reference beam 6 during exposure, a real image 8 of the subject 5 is produced by a beam 7a defining with the direction of the beam of coherent light 6a, an angle which is the same angle as was formed between reference wave 6 and subject wave 7 during the exposure. At the same time, a virtual image 8a is formed. The arrangements illustrated in FIGS. 1 and 2 are known.

Moving subjects which are to be reproduced in the form of moving pictures, have generally such a size that the presently known sources of coherent light are insufficient for illuminating the subjects sufficiently. In order to produce holograms for recording and reproducing moving pictures of subjects, in accordance with the invention, a conventional motion picture of the moving subject is made, of which holograms are made on an intermittently advanced record carrier in the manner described with reference to FIG. 1.

When a hologram produced on an intermittently advanced record carrier in this way is continuously reproduced, certain difficulties develop inasmuch as each portion of the individual picture hologram "sees" the subject at a different perspective. Consequently, the kinematographic representation of several holograms of individual phases of the motion causes jerky movements of the reproduced images. In accordance with the invention, the perspective phenomena can be corrected in two different ways.

Figure 3:
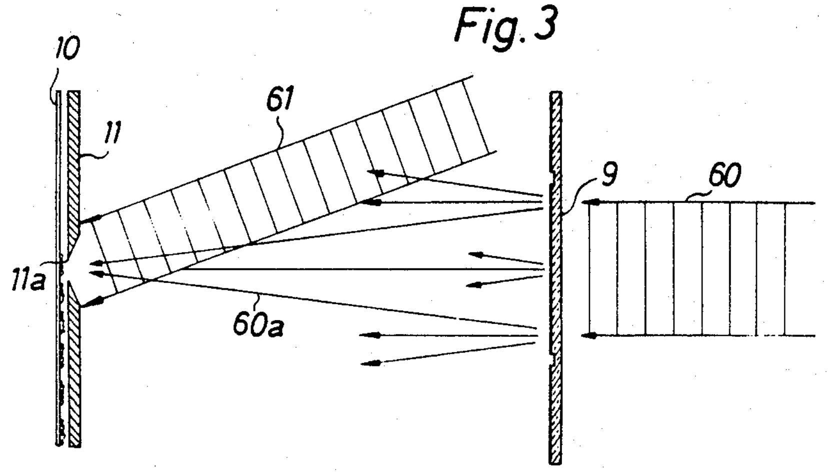
FIG. 3 is a schematic sectional view illustrating an embodiment of the invention for producing strip-shaped holograms.

In the embodiment of FIG. 3, a frame 9 of a conventional motion picture film is located opposite a photosensitive record carrier 10. A diaphragm 11 having a gap extending transverse to the direction of movement of record carrier 10, covers the record carrier. A beam of coherent light 60 is directed through picture frame 9 to form a subject wave impinging record carrier 10 through gap 11a, and interfering with the reference beam 61 of coherent light so that a strip-shaped hologram is photographically recorded on a photosensitive record carrier 10. The width of gap 11a in a direction of movement of the record carrier 10 is selected to be so small as that between the leading and trailing edges of the exposed strip-shaped portion of the carrier, only a negligible perspective displacement takes place. It is necessary to intermittently advance record carrier 10 by transporting means of the type used in conventional copying machines so that adjacent completely identical part holograms follow each other. After determination of the length of the required stepwise movements, the transporting means, not shown, are accordingly designed. The motion picture film and the record carrier are moved through the beams 60, 60a and 61 so that successive pictures appearing on successive frames 9 are recorded in the form of strip-shaped holograms.

Figure 4:
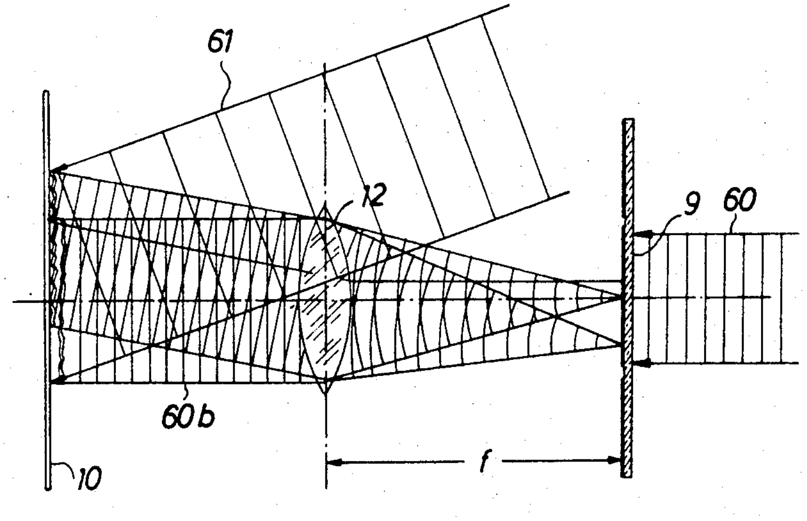
FIG. 4 is a schematic sectional view illustrating another embodiment of the invention for producing holograms.

In the embodiment of FIG. 4, a motion picture film having frames 9 is disposed parallel to the photosensitive record carrier, as described with reference to FIG. 3. A picture frame 9 is penetrated by a beam of coherent light 60. The frame 9 is disposed in the focal plane of a lens 12 spaced the focal distance $f$ so that a beam of parallel rays is formed left of lens 12 of each point of the picture frame 9. Due to the interference of the subject wave 60b with the reference wave 61, holograms are formed on the record carrier 10, but since subject wave 60b represents the image of picture frame 9 as if it were at infinity, the above-described perspective phenomena are eliminated.

Figure 5:
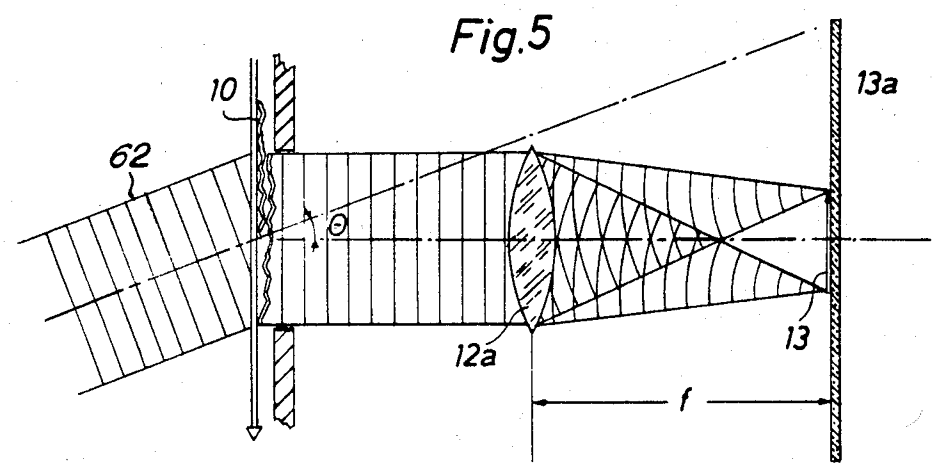
FIG. 5 is a schematic sectional view illustrating an embodiment of the invention for reproducing the holograms made by the arrangement of FIG. 4.
Figure 6:
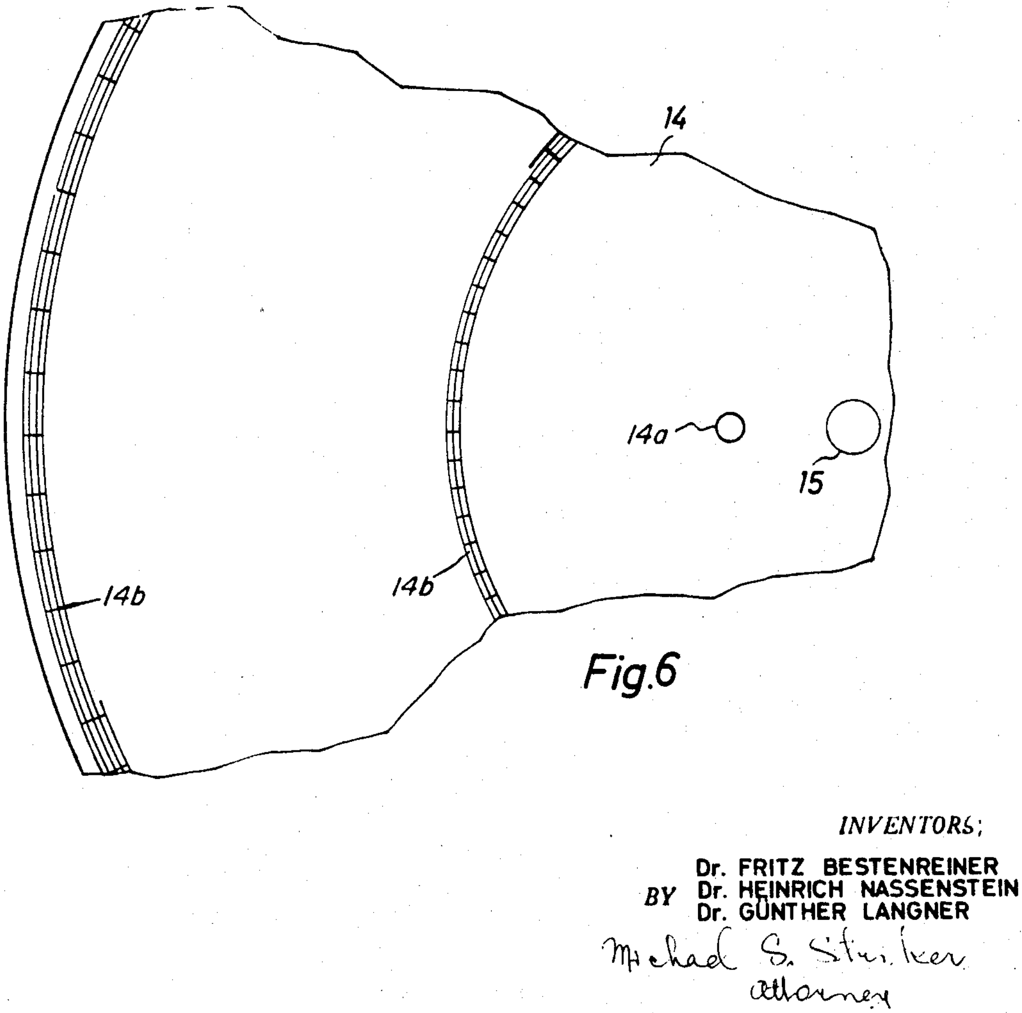
FIG. 6 is a fragmentary sectional view of a circular hologram carrier.

FIG. 5 shows an arrangement for reproducing a hologram produced by the arrangement of FIG. 4. The hologram on record carrier 10 which moves in the direction of the arrow is transparent and penetrated by a beam of coherent light 62, produced by a laser, as are beams 60 and 61 in the arrangements of FIGS. 3 and 4. The hologram is shown in FIGS. 4 and 5 at an exaggerated size for clearly showing the paths of the rays, and the actual size of a hologram unit 14b is shown in FIG. 6. After the beam 62 of coherent light has passed through the developed holograms, it passes through a lens 12a which produces a real image 13 of the picture on frame 9 on a screen 13a located in the focal plane of lens 12a. This comparatively small real image 13 can also be projected onto the photocathode of a vidicon tube of a television camera, and transmitted to a television receiver where the image is produced at a sufficiently large size so that a motion picture film recorded on a hologram carrier can be viewed on a television set. As compared with the usual reproduction of motion picture film on a television set, the arrangement of the invention has the advantage that the hologram carrier is very small, and may have the size of a phonograph record. Instead of standard motion picture film, the small hologram carriers are handled by the television station.

Several holograms can be superimposed on the same carrier. In order to separately reproduce the images reproduced by the superimposed holograms, it is necessary that during the recording of the holograms, a different relative position of the reference wave and of the subject wave is selected. If, during reproduction, the hologram is perpendicularly penetrated by a coherent beam of light having the same wave length as the beam of light used for the recording of the hologram, the real image of the subject is formed at an angle to the penetrating beam of coherent light corresponding to the angle between reference wave and subject wave during exposure of the hologram.

In this connection, the spatial frequency has to be considered, which is the number of distinguishable lines per millimeter. The spatial frequency of photographic film is characteristic of the storage capacity of the same, and represents the resolving power of the photosensitive carrier. Assuming a maximum obtainable spatial frequency of the hologram carrier of 500 lines per mm., a real image having the area of a frame of a 16 mm. motion picture film, and a distance of 30 mm. from the hologram to the real image, approximately 30,000 hologram units can be recorded along a spiral-shaped track on a circular ring area having an outer diameter of 300 mm. and an inner diameter of 100 mm. Assuming further the usual picture frequency of 24 pictures per second, and the superimposing of four holograms, one side of a hologram record carrier can be played for 1 hour and 20 minutes which would require a substantial length of motion picture film. If the original motion picture film is larger than 16 mm. film, the corresponding holograms are larger and the playback time greater.

When holograms representing the colors of color film are to be made, the three color components of the color film are projected at three different angles by beams of coherent light onto the photosensitive surface of the carrier, so that a playing time of over 20 minutes results. When the local frequency is increased from 500 lines to about 700 lines mm., 10 black and white pictures, or three color pictures, can be recorded on each hologram unit while maintaining the quality of the real image without difficulties.

FIG. 6 illustrates a portion of the "long playing hologram record" 14 in its actual size. The diameter of the holographic record 14 is about 300 mm., the radial width of the hologram units 14b is about 1.2 mm., and the circumferential length of the hologram units is between 5 mm. and 11 mm., depending on the radial distance from the center of the record. Square hologram units having an area of 1 $mm.^2$ are possible. A central bore 15 is provided for centering the hologram record on a turntable having another pin passing through the eccentric bore 14a for determining the initial angular position of the record at which the laser of the reproducing apparatus is located at the beginning of the spiral shaped track of holograms.

The hologram reproduced by the embodiment of FIG. 5 is transparent, is penetrated by the coherent light, and is consequently an absorption hologram. However, it is also possible to record a phase hologram on a transparent carrier. If the hologram is formed in a known manner as a relief on a reflecting record carrier, it produces a reflected real image when impinged by coherent light. Relief holograms can be produced by stamping a carrier consisting of thermoplastic material whereupon a reflecting surface is formed by vaporizing or electroplating a metal coating onto the relief hologram. It is also possible to use a thermoplastic highly reflecting material for the carrier which is stamped with the relief hologram.

Figures 7, 8, 9:
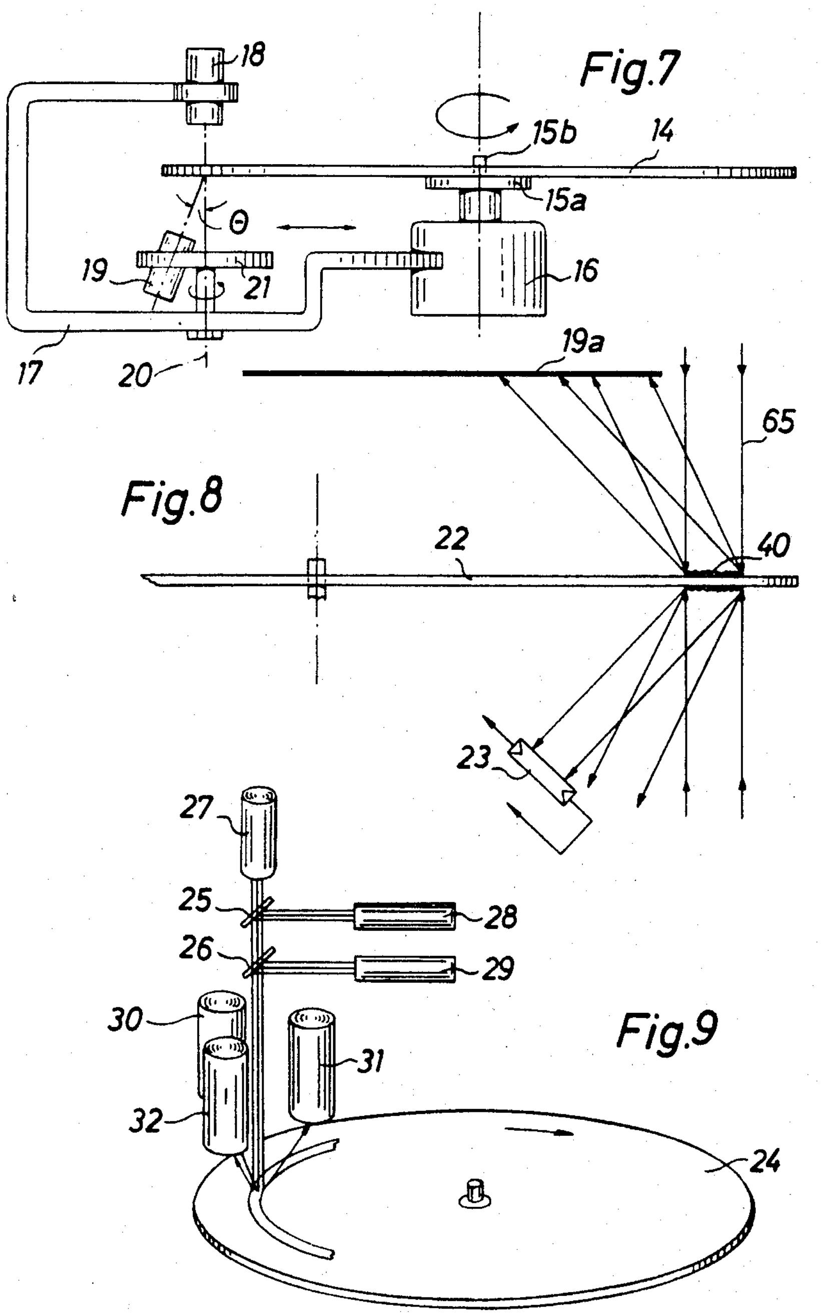
FIG. 7 is a fragmentary schematic view illustrating apparatus for reproducing images recorded in the form of holograms on the carrier shown in FIG. 6.
FIG. 8 is a fragmentary schematic view illustrating an arrangement in which the carrier has on one side recorded holograms representing visual information, and on its other side a relief hologram representing acoustic information.
FIG. 9 is a fragmentary schematic perspective view illustrating apparatus for reproducing color images from a hologram representing the colors of a subject.

FIG. 7 illustrates an embodiment for reproducing absorption holograms arranged along a spiral-shaped track on a transparent record carrier 14 of circular shape, as described with reference to FIG. 6. It is evident that the apparatus can be modified if a hologram carrier is a tape having the holograms along the length thereof. Such a tape may be housed in a cartridge.

Carrier plate 14 is located on a turntable 15*a* having a centering pin 15*b* located in the central hole 15 of the record carrier 14. Another pin, not shown, is located in an eccentric bore 14*a* so that record carrier 14 rotates with supporting turntable 15*a* when motor 16 is started. The speed of motor 16 is selected so that 24 hologram units per second pass the reproduction apparatus which includes a laser 18 and a vidicon tube 19. Each hologram unit carries the visual information of a single frame of the motion picture film.

A U-shaped supporting arm 17 has two portions located on opposite sides of record carrier 14, and is operated by motor 16 through a conventional transmission in the casing of motor 16 to perform a radial inward movement at a speed depending on the number of revolutions of turntable 15*a* and record carrier 14 on the number of turns of the spiral-shaped track formed by the holograms on record carrier 14, and on the radial width of the holograms. The upper portion of supporting arm 17 supports a laser 18 producing a beam of coherent light penetrating the transparent record carrier. During rotation of the record carrier 14 and simultaneous radial movement of supporting arm 17 with laser 18, the beam of the laser moves along the spiral-shaped track on which the holograms are recorded. The radial extension of the beam corresponds to the radial width of the hologram track, and the circumferential extension corresponds to the minimum length of a single picture hologram.

As explained with reference to FIG. 2, each hologram produces a real image by a wave moving at an angle $\theta$ to the direction of the laser beam. A vidicon tube 19 of a television camera is disposed so that the real image is formed on the photocathode, and connected in the usual manner with a television receiver, not shown, so that the enlarged picture of the real image appears on the screen of the television receiver.

The vidicon tube 19 is mounted on a rotatable holding member 21 which is mounted on supporting arm 17 for turning movement about an axis 20, coinciding with the axis of laser 18. When holding member 21 is turned, the vidicon tube 19 is placed in different positions relative to the beam of laser 18, but in all angularly displaced positions, the axis of vidicon tube 19 is located on a cone surface having its apex in the hologram on record carrier 14.

A black-and-white hologram can be made in the form of a multiple track. After the supporting arm 17 has moved the reproduction apparatus 18, 19 to the innermost position of the innermost spiral-shaped hologram track, the vidicon tube 19 is shifted to a position cooperating with the next following track, for example by running against a stationary stop. The following track may have to be sensed as the first track, which requires a return of laser 18 and vidicon tube 19 to the periphery of the record carrier to the beginning of the second track. However, it is also possible to sense the next following track from the center of the record carrier to its periphery, in which event the direction of movement of supporting arm 17 in radial direction is reversed at the ends and beginnings of the tracks.

If not all superimposed holograms were recorded at the same angle between the reference beam and the subject beam at different azimuths, vidicon tube 19 must be turned with holding means 21 to compensate the different angles between subject wave and reference wave.

However, it is also possible to place a mirror in the position of the real image, a second image in the axis of the holding means 21, and to arrange the vidicon tube in the axis of holding means 21, in which construction the position of the mirrors has to be adjusted so that the real image is projected along to the axis of holding means 21 into the vidicon tube.

In another modification, at each point of the image, a mirror is provided which is covered by a vane shutter, and only uncovered during the reproduction of the respective track.

While the embodiment of FIG. 7 is concerned with a transparent record carrier, the embodiment of FIG. 9 uses a reflecting carrier 24 having relief holograms. Since the light does not penetrate the record carrier 22, both sides can be used for recording holograms. On the upper side, holograms representing visual information are recorded, while on the other side of the record carrier, a relief hologram has several tracks corresponding to a laser amplitude modulated in the rhythm of acoustic frequencies. With this arrangement, a photoreceiver 23 which follows each sensed hologram track as explained for the vidicon tube in the embodiment of FIG. 7, reproduces sound at the same time as the visual information recorded on the other side of the record carrier 22 is sensed and visually reproduced, as explained above.

However, it is also possible to record on the second side of the hologram carrier, a needle groove with recorded acoustic information which is audibly reproduced in the usual manner during the playing time of the side of the record carrier having holograms representing visual information.

In the upper portion of FIG. 8, the laser beam 65 is shown to be reflected by the reflecting relief hologram 40 onto a photocathode 19*a* of a vidicon tube, or onto a screen on which the real image appears.

Holograms representing moving pictures of colored subjects can be recorded on a very small area. In order to record a three color component hologram, three lasers in the basic colors, for example a helium neon laser for red, an argon laser for blue, and a modified argon laser for green can be arranged in such a position that the subject waves emanating from a color motion film are superimposed on the corresponding reference waves in each color component at the same place of the record carrier so that the hologram is recorded in all three colors.

Recently, argon lasers have become known which emit light in all three basic colors. If a laser of this type is used, it is sufficient as a source of coherent light in all three basic colors.

Since a reproduction of a hologram bent by light of a different wavelength causes changes of the size and even position of the subject image, it is necessary to use during the reproduction coherent light of the same wavelength as during the recording so that three lasers have to be used for the reproduction, if three lasers associated with different colors were used during the recording of the color picture.

In accordance with the position of the subject, for example of a color film during the recording of the holograms, the real images of the recorded frame are formed in the colors of the respective lasers at different points.

FIG. 9 illustrates an embodiment in which three vidicon tubes 30, 31 and 32 for the respective color filters are provided which in the manner of known color television apparatus, transmit the pictures to a single color television receiver, not shown, where a colored picture is formed on the screen of the three images.

However, it is also possible to substitute optical means, such as mirrors or prisms for the vidicon tubes 30, 31 and 32 by which the real images are reflected and superimposed to produce a comparatively small, but very bright colored picture which can be magnified by optical projection systems to a suitable size permitting viewing. Instead of mirrors, fiber optical elements may be used whose fibers are combined at the reproduction surface.

FIG. 9 shows a helium neon laser 27, and argon lasers for blue 28 and for green 29 projecting beams of coherent colored light at right angles to the beam of laser 27. Part transparent mirrors 25, 26 are disposed at the points of intersection of the laser beams so that a combined beam impinges the reflecting color hologram on record carrier 24 and produces real images on the photocathodes of the three vidicon tubes 30, 31, 32.

If the hologram of a color picture consist of three holograms of the additive basic colors superimposed in different angular positions of the reference beam and the subject beam, so that three different tracks respectively correspond to the three color components, the reproduction is even easier. Only a single laser is required whose beam perpendicularly impinges the surface of the hologram carrier at three different points, the real images of the three color components are formed in the color of the sensing laser, which can be placed on the photocathode of vidicon tubes and superimposed on the screen of a television receiver.

It will be understood that each of the elements described above, or two or more together, may also find a useful application in other types of arrangements for recording and reproducing holograms differing from the types described above.

While the invention has been illustrated and described as embodied in a method for recording and reproducing motion picture film by means of holograms on a record carrier having the size of a phonograph record, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A method of recording and reproducing images of moving subjects, comprising, in combination, placing a motion picture film having a series of frames representing successive pictures of said moving subjects in the focal plane of a lens, illuminating one of said frames with a beam of at least substantially coherent light so that the lens projects the pictures in infinity in a beam of parallel rays; interfering with said rays a reference beam of at least substantially coherent light to produce on an intermittently advanced photosensitive carrier a sequence of adjacent holograms according to said pictures; moving continuously said photosensitive carrier with the holograms thereon through a readout beam of at least substantially coherent light and past a lens so that said holograms are successively illuminated and said lens forms real images of said pictures in the focal plane thereof; and reproducing said real images which are formed in said focal plane.

2. The method of claim 1 comprising recording the holograms of a plurality of subject positions superimposed at the same location of said carrier; and positioning a beam of coherent light and the subject during the recording of the holograms so that the reference wave and the subject wave are in different positions when superimposed holograms of different subject positions are recorded.

3. The method of claim 2 comprising varying the azimuths of said reference wave and said subject wave, and changing the angle between said reference wave and said subject wave during recording of successive holograms on the same portion of said carrier.

4. The method of claim 2 comprising recording a plurality of said frames in superimposed holograms; varying the position of the readout beam relative to the plane of the holograms for each passage of said carrier with the superimposed holograms.

5. The method of claim 1 comprising recording a plurality of superimposed holograms of the subject in different color components; and superimposing the images of said plurality of holograms during reproduction.